US011155148B2

(12) United States Patent
Chung et al.

(10) Patent No.: US 11,155,148 B2
(45) Date of Patent: Oct. 26, 2021

(54) INTEGRATED MOUNTING SYSTEMS FOR MOUNTING ELECTRIC DRIVE COMPONENTS WITHIN ELECTRIFIED VEHICLES

(71) Applicant: FORD GLOBAL TECHNOLOGIES, LLC, Dearborn, MI (US)

(72) Inventors: Do Young Chung, Windsor (CA); Jason C. Marcath, Dearborn, MI (US); Afif Sabbagh, Troy, MI (US); Suma Rani Das, Garden City, MI (US); Paul Webb, Warren, MI (US); Doug G. Hughes, South Lyon, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 168 days.

(21) Appl. No.: 16/375,922

(22) Filed: Apr. 5, 2019

(65) Prior Publication Data

US 2020/0317039 A1 Oct. 8, 2020

(51) Int. Cl.
*B60K 1/00* (2006.01)
*B60K 1/04* (2019.01)
*B62D 21/02* (2006.01)
*H02M 7/42* (2006.01)
*B60K 6/40* (2007.10)
*B62D 21/15* (2006.01)
*B60L 50/16* (2019.01)

(52) U.S. Cl.
CPC ............... *B60K 1/04* (2013.01); *B60K 6/40* (2013.01); *B60L 50/16* (2019.02); *B62D 21/02* (2013.01); *B62D 21/152* (2013.01); *H02M 7/42* (2013.01)

(58) Field of Classification Search
CPC ...... B60K 1/00; B60K 2001/001; B60K 6/40; B62D 21/02; B62D 21/152; B60L 50/51
See application file for complete search history.

(56) References Cited

U.S. PATENT DOCUMENTS

| 4,316,132 | A | * | 2/1982 | Geppert | B60L 53/24 |
| | | | | | 318/723 |
| 5,110,177 | A | * | 5/1992 | Akio | B62D 21/11 |
| | | | | | 280/784 |
| 6,022,048 | A | | 2/2000 | Harshbarger et al. | |
| 8,276,696 | B2 | | 10/2012 | Lucas | |
| 8,336,657 | B2 | | 12/2012 | Dobbins et al. | |
| 8,708,401 | B2 | | 4/2014 | Lee et al. | |

(Continued)

FOREIGN PATENT DOCUMENTS

| DE | 10 2013 007 976 A1 | 11/2014 |
| DE | 10 2017 130 399 A1 | 6/2018 |
| JP | 6447642 B2 | 1/2019 |

*Primary Examiner* — Frank B Vanaman
(74) *Attorney, Agent, or Firm* — David B. Kelley; Carlson, Gaskey & Olds (57) ABSTRACT

Integrated mounting systems for mounting electric drive components within electrified vehicles may include a cross brace assembly that mounts or supports one or more electric drive components relative to a vehicle frame. A cross brace assembly of the mounting system may include a cross brace, a first bridging side bracket, and a second bridging side bracket. The cross brace may be mounted to lower surfaces of vehicle frame rails and the bridging side brackets may be mounted to upper surfaces of the vehicle frame rails to provide a robust and serviceable mounting solution that evenly distributes vehicle loads.

17 Claims, 8 Drawing Sheets

(56) References Cited

U.S. PATENT DOCUMENTS

| | | |
|---|---|---|
| 9,227,670 B2 | 1/2016 | Schaal |
| 9,937,781 B1 | 4/2018 | Bryer et al. |
| 2004/0159478 A1* | 8/2004 | Masuda ............... B60K 1/00 180/65.22 |
| 2008/0078603 A1* | 4/2008 | Taji ..................... B60K 1/00 180/312 |
| 2010/0101885 A1* | 4/2010 | Nozaki ................ B60K 1/00 180/232 |
| 2012/0292124 A1* | 11/2012 | Yamashita .......... B62D 21/155 180/291 |
| 2014/0311812 A1* | 10/2014 | Kambayashi ........ B60K 1/00 180/65.1 |
| 2016/0214475 A1 | 7/2016 | Rawlinson |
| 2019/0126989 A1* | 5/2019 | Okura .................. B60K 1/00 |
| 2019/0375282 A1* | 12/2019 | Lee ..................... B60K 1/04 |

* cited by examiner

INTEGRATED MOUNTING SYSTEMS FOR MOUNTING ELECTRIC DRIVE COMPONENTS WITHIN ELECTRIFIED VEHICLES

TECHNICAL FIELD

This disclosure relates to integrated mounting systems for mounting electric drive components within electrified vehicles.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines (e.g., electric motors). Conventional motor vehicles, by contrast, rely exclusively on the internal combustion engine to propel the vehicle. A high voltage traction battery pack typically powers the electric machines and other electrical loads of the electrified vehicle.

The electric machines and other electric drive components that are necessary for achieving electric propulsion are typically packaged within electrified vehicles using various mounting systems. Known mounting systems have not adequately provided robust and serviceable mounting solutions that evenly distribute vehicle loads.

SUMMARY

An integrated mounting system for an electrified vehicle according to an exemplary aspect of the present disclosure includes, among other things, a cross brace assembly including a cross brace, a first bridging side bracket mounted to the cross brace, and a second bridging side bracket mounted to the cross brace. A first electric drive component is suspended from the cross brace by at least one isolator mount, and a second electric drive component is mounted at a plurality of mount tabs of the cross brace.

In a further non-limiting embodiment of the foregoing integrated mounting system, the first electric drive component is an electric machine and the second electric drive component is a charger stack.

In a further non-limiting embodiment of either of the foregoing integrated mounting systems, the charger stack includes a high voltage charger, a motor controller, a DC/DC converter, and a communications gateway.

In a further non-limiting embodiment of any of the foregoing integrated mounting systems, the at least one isolator mount is received within an opening of a platform of the cross brace.

In a further non-limiting embodiment of any of the foregoing integrated mounting systems, the cross brace includes a front wall section, a rear wall section, and a platform that connects between the front wall section and the rear wall section, and each of the front wall section and the rear wall section extends between opposing end portions and between an upper surface and a lower surface.

In a further non-limiting embodiment of any of the foregoing integrated mounting systems, mount pads are disposed at an interface between the upper surfaces and the opposing end portions of the front wall section and the rear wall section, and mount legs are disposed at an interface between the lower surface and the opposing end portions of the front wall section and the rear wall section.

In a further non-limiting embodiment of any of the foregoing integrated mounting systems, portions of the front wall section and the rear wall section are arched or curved.

In a further non-limiting embodiment of any of the foregoing integrated mounting systems, the first bridging side bracket is mounted to each of the cross brace and an upper surface of a first vehicle frame rail, the second bridging side bracket is mounted to each of the cross brace and an upper surface of a second vehicle frame rail, and the cross brace is mounted to a lower surface of both the first vehicle frame rail and the second vehicle frame rail.

In a further non-limiting embodiment of any of the foregoing integrated mounting systems, the system includes a first plurality of fasteners for mounting the first bridging side bracket to the upper surface of the first vehicle frame rail, a second plurality of fasteners for mounting the second bridging side bracket to the upper surface of the second vehicle frame rail, a third plurality of fasteners for mounting the cross brace to the lower surface of the first vehicle frame rail, and a fourth plurality of fasteners for mounting the cross brace to the lower surface of the second vehicle frame rail.

In a further non-limiting embodiment of any of the foregoing integrated mounting systems, the third plurality of fasteners are received through a first set of mount legs of the cross brace, and the fourth plurality of fasteners are received through a second set of mount legs of the cross brace.

An electrified vehicle according to another exemplary aspect of the present disclosure includes, among other things, a vehicle frame rail, a cross brace assembly mounted to the vehicle frame rail, and an electric drive component secured relative to the vehicle frame rail by the cross brace assembly. A cross brace of the cross brace assembly is mounted to a lower surface of the vehicle frame rail, and a bridging side bracket of the cross brace assembly is mounted to an upper surface of the vehicle frame rail.

In a further non-limiting embodiment of the foregoing electrified vehicle, the electric drive component is an electric machine, a charger stack, or both.

In a further non-limiting embodiment of either of the foregoing electrified vehicles, the vehicle frame rail extends within a front compartment of a front end assembly of the electrified vehicle.

In a further non-limiting embodiment of any of the foregoing electrified vehicles, a first plurality of fasteners secure the bridging side bracket to the cross brace, a second plurality of fasteners secure the bridging side bracket to the upper surface of the vehicle frame rail, and a third plurality of fasteners secure the cross brace to the lower surface of the vehicle frame rail.

In a further non-limiting embodiment of any of the foregoing electrified vehicles, the first plurality of fasteners extend through a first set of mount holes of the bridging side bracket, the second plurality of fasteners extend through a second set of mount holes of the bridging side bracket, and the third plurality of fasteners extend through a set of mount legs of the cross brace.

In a further non-limiting embodiment of any of the foregoing electrified vehicles, the cross brace includes a hollow section.

In a further non-limiting embodiment of any of the foregoing electrified vehicles, the bridging side bracket includes at least one cut-out opening.

In a further non-limiting embodiment of any of the foregoing electrified vehicles, a second bridging side bracket is mounted to the cross brace and to an upper surface of a second vehicle frame rail. The cross brace is mounted to a lower surface of the second vehicle frame rail.

In a further non-limiting embodiment of any of the foregoing electrified vehicles, the cross brace is comprised of a first aluminum alloy and the bridging side bracket is comprised of a second, different aluminum alloy.

In a further non-limiting embodiment of any of the foregoing electrified vehicles, the electrified vehicle is a battery electric vehicle (BEV).

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details integrated mounting systems for mounting electric drive components within electrified vehicles. An exemplary mounting system may include a cross brace assembly that mounts or supports one or more electric drive components relative to a vehicle frame. A cross brace assembly of the mounting system may include a cross brace, a first bridging side bracket, and a second bridging side bracket. The cross brace may be mounted to lower surfaces of vehicle frame rails and the bridging side brackets may be mounted to upper surfaces of the vehicle frame rails to provide a robust and serviceable mounting solution that evenly distributes vehicle loads. These and other features are discussed in greater detail in the following paragraphs of this detailed description.

Figure 1:
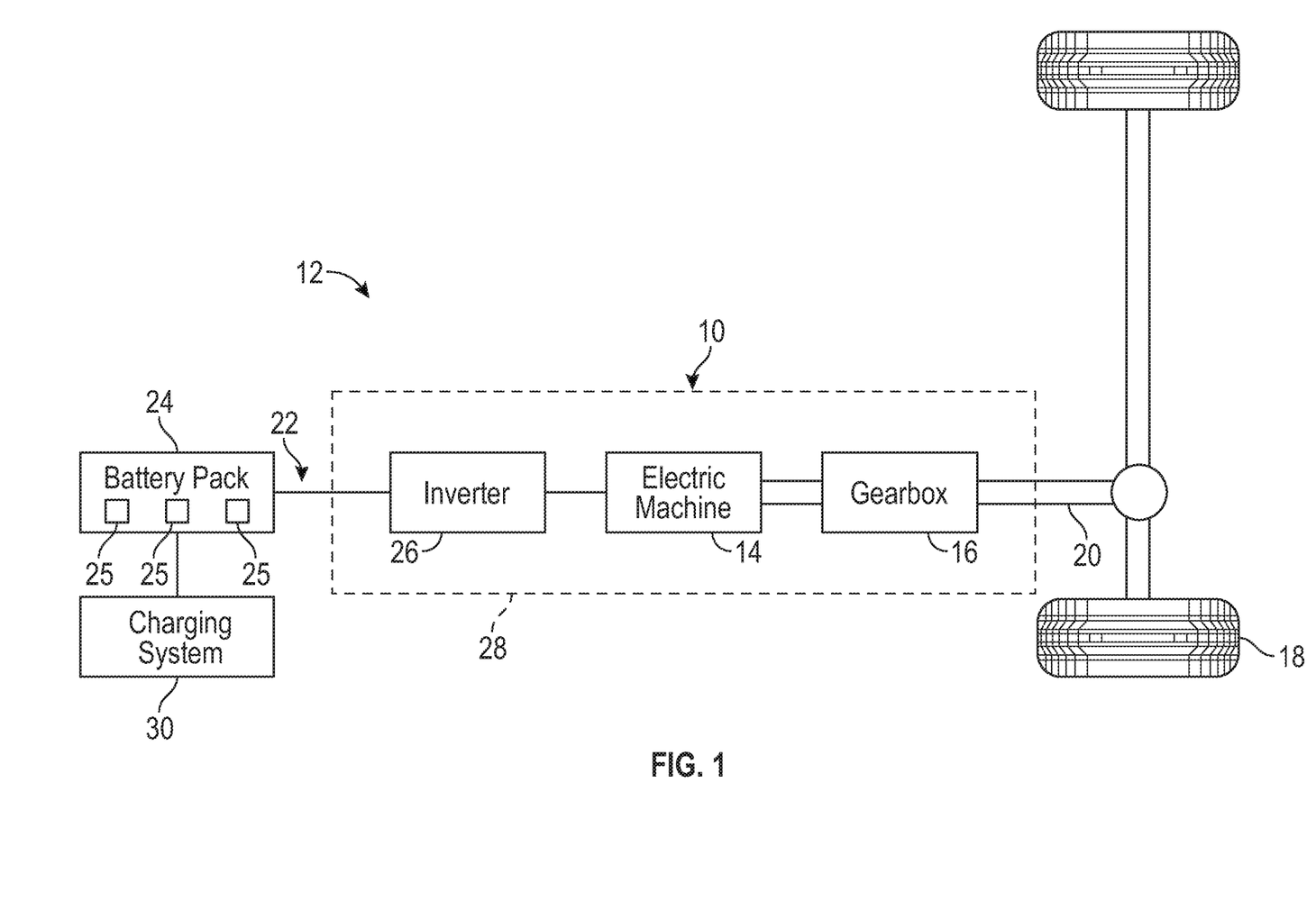
FIG. 1 schematically illustrates a powertrain of an electrified vehicle.

FIG. 1 schematically illustrates a powertrain 10 of an electrified vehicle 12. In an embodiment, the electrified vehicle 12 is a battery electric vehicle (BEV). In another embodiment, the electrified vehicle 12 is a hybrid electric vehicle (HEV) or a plug-in hybrid electric vehicle (PHEV). Therefore, although not shown in this embodiment, the electrified vehicle 12 could be equipped with an internal combustion engine that can be employed either alone or in combination with other energy sources to propel the electrified vehicle 12.

In the illustrated embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power and provides a rotational output torque. The electric machine 14 may be connected to a gearbox 16 for adjusting the output torque and speed of the electric machine 14 by a predetermined gear ratio. The gearbox 16 is connected to a set of drive wheels 18 by an output shaft 20. A voltage bus 22 electrically connects the electric machine 14 to a battery pack 24 through an inverter 26. The electric machine 14, the gearbox 16, and the inverter 26 may be collectively referred to as a transmission 28.

The battery pack 24 is an exemplary electrified vehicle battery. The battery pack 24 may be a high voltage traction battery pack that includes a plurality of battery arrays 25 (i.e., battery assemblies or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The electrified vehicle 12 may also be equipped with a charging system 30 for charging the energy storage devices (e.g., battery cells) of the battery pack 24. The charging system 30 may include charging components that are located both onboard the electrified vehicle 12 (e.g. vehicle inlet assembly, etc.) and external to the electrified vehicle 12 (e.g., electric vehicle supply equipment (EVSE), etc.). The charging system 30 can be connected to an external power source (e.g., a wall outlet, a charging station, etc.) for receiving and distributing power received from the external power source throughout the electrified vehicle 12.

The powertrain 10 depicted by FIG. 1 is highly schematic and is not intended to limit this disclosure. Various additional components could alternatively or additionally be employed by the powertrain 10 within the scope of this disclosure.

Figure 2:
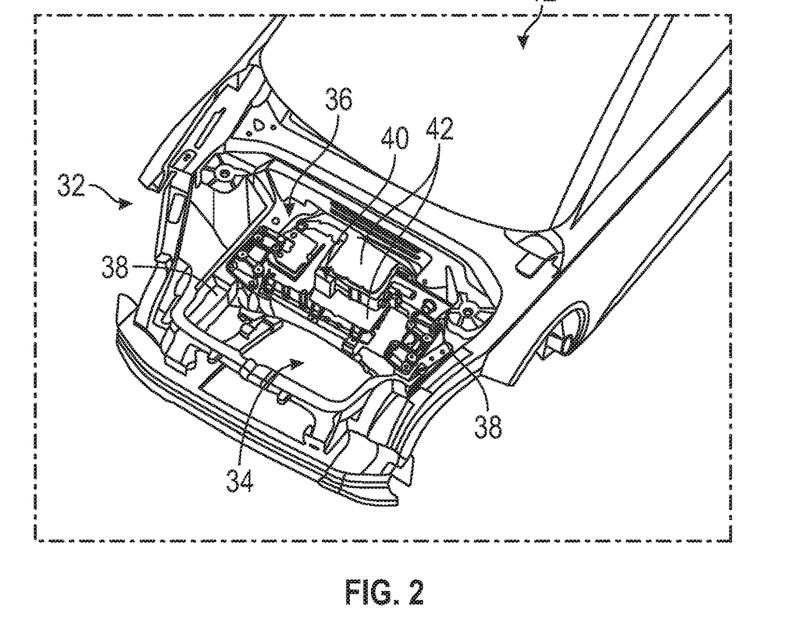
FIG. 2 illustrates an electrified vehicle that may employ the powertrain of FIG. 1.

FIG. 2 illustrates an electrified vehicle 12 that may employ the powertrain 10 of FIG. 1, or any other electrified or hybridized powertrain. In an embodiment, the electrified vehicle 12 is a car. However, the electrified vehicle 12 could be a car, a truck, a van, a sport utility vehicle, or any other vehicle type. In addition, the electrified vehicle 12 could be a rear wheel drive vehicle, a front wheel drive vehicle, or an all-wheel drive vehicle.

Although a specific component relationship is illustrated in the figures of this disclosure, the illustrations are not intended to limit this disclosure. The placement and orientation of the various components of the electrified vehicle 12 are shown schematically and could vary within the scope of this disclosure. In addition, the various figures accompanying this disclosure are not necessarily drawn to scale, and some features may be exaggerated or minimized to show certain details of a particular component.

The electrified vehicle 12 may include a front end assembly 32 having a front compartment 34. Portions of a vehicle frame 36 (sometimes referred to simply as a "frame") may extend within and be supported relative to the front compartment 34. The vehicle frame 36 is the main underbody supporting structure of the electrified vehicle 12, to which various components may be attached, either directly or indirectly. The vehicle frame 36 may include a unibody construction, in which the chassis and body of the electrified vehicle 12 are integrated into one another, or may be part of a body-on-frame construction. The vehicle frame 36 may be made of a metallic material, such as steel, carbon steel, or an aluminum alloy, as non-limiting examples. The vehicle frame 36 may include a plurality of rails 38 (sometimes referred to as "frame rails" or "beams"). FIG. 2 shows two such rails 38. The rails 38 are spaced apart from one another and extend longitudinally to establish a length of the vehicle frame 36.

In an embodiment, an integrated mounting system 40 may be positioned within the front compartment 34 and may be mounted to the rails 38 of the vehicle frame 36. As further discussed below, the integrated mounting system 40 may mount or support one or more electric drive components 42 relative to the vehicle frame 36. The electric drive components 42 enable the electric propulsion of the electrified vehicle 12.

Figure 11:
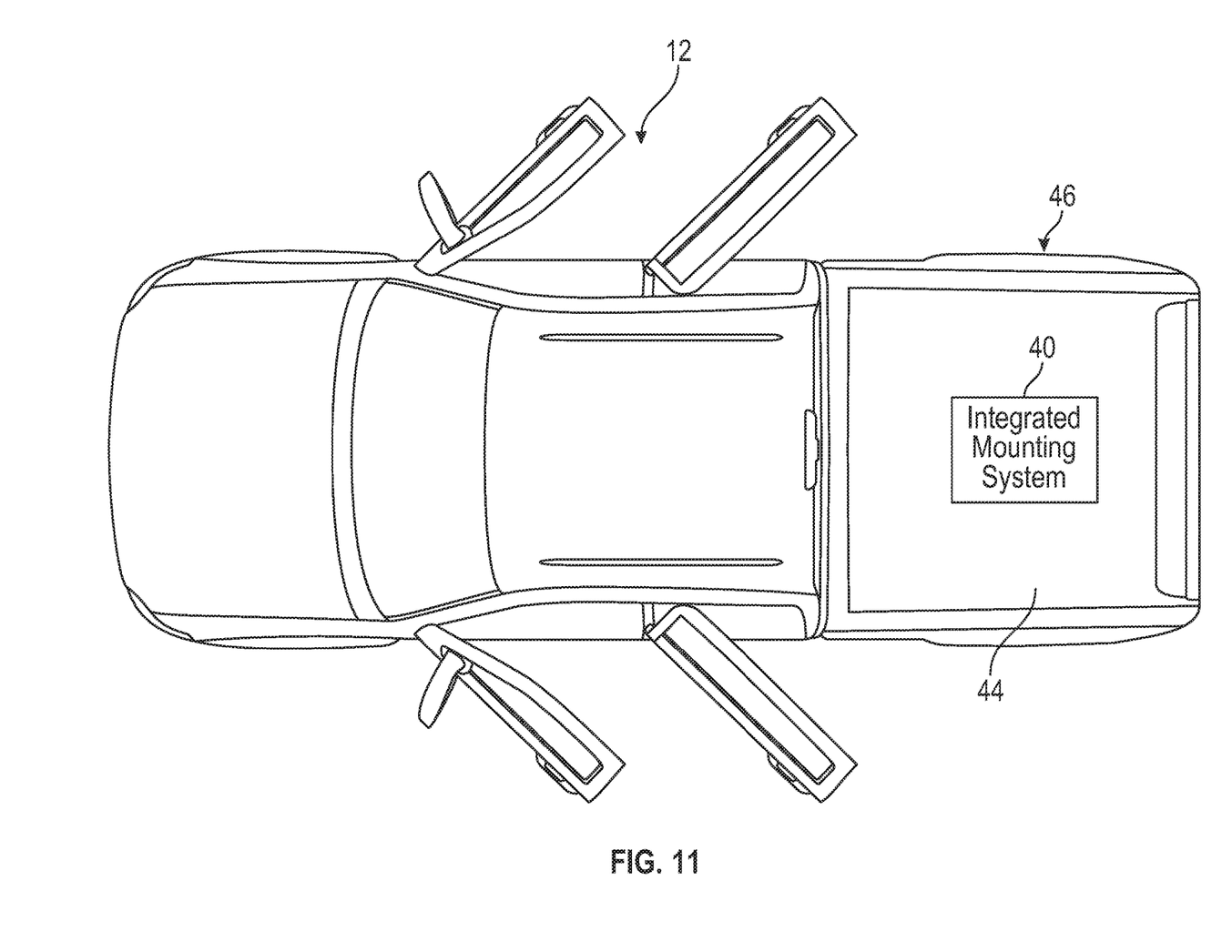
FIG. 11 illustrates an exemplary mounting location of an integrated mounting system for an electrified vehicle.

The mounting location of the integrated mounting system 40 shown in FIG. 2 is not intended to be limiting, and therefore other mounting locations are contemplated within the scope of this disclosure. For example, in another exemplary embodiment, the integrated mounting system 40 may be positioned within a rear compartment 44 of a rear end assembly 46 of the electrified vehicle 12 (see FIG. 11).

Figure 3:
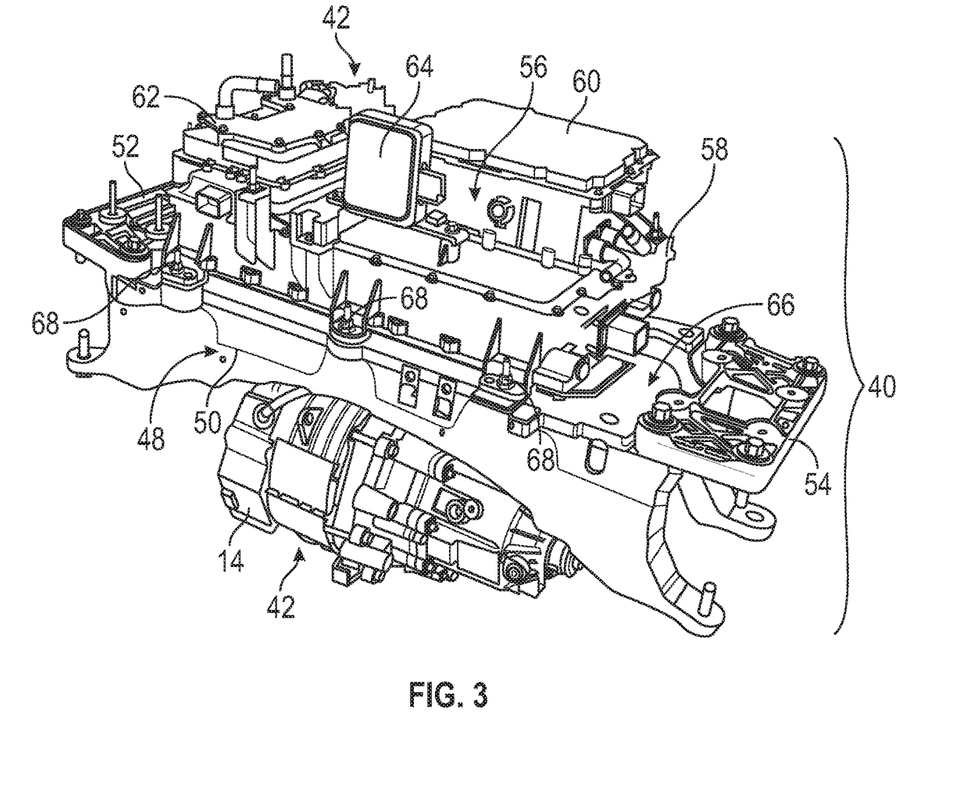
FIG. 3 illustrates an integrated mounting system for mounting electric drive components within an electrified vehicle.

FIG. 3 illustrates the exemplary integrated mounting system 40 of the electrified vehicle 12 of FIG. 2. The integrated mounting system 40 is a modular system that may include, among other things, a cross brace assembly 48 and one or more electric drive components 42 that are mounted to and supported by the cross brace assembly 48. The integrated mounting system 40 is considered "integrated" in that it incorporates all the necessary mounting components (e.g., electric drive component brackets and mounts, hose and wiring brackets and mounts, fastener mounts, etc.) within a single assembly, thereby reducing cost, weight, and assembly operations compared to prior mounting systems. In an embodiment, the cross brace assembly 48 includes a cross brace 50, a first bridging side bracket 52, and a second bridging side bracket 54.

The electric drive components 42 of the integrated mounting system 40 may include a plurality of electrified vehicle powertrain components. In an embodiment, the electric drive components 42 include the electric machine 14 or electric motor (i.e., a first electric drive component) and a charger stack 56 (i.e., a second electric drive component). The charger stack 56 may include, among other things, a high voltage charger 58 (sometimes referred to as an on-board charger), a motor controller 60 (sometimes referred to as an ISC inverter), a DC/DC converter 62, and a communications gateway 64 (sometimes referred to as a digital communication gateway module for communicating with a DC fast charger EVSE). Other electric drive components that may be incorporated as part of the integrated mounting system 40 include, but are not limited to, cables (both high voltage and low voltage), cooling hoses and valves, an auxiliary water pump for various cooling modules, an electric heater, a compressor, a low voltage battery, and a DC/AC Inverter.

In an embodiment, the electric machine 14 is suspended from a platform 66 of the cross brace 50 and the charger stack 56 is mounted atop the platform 66, such as for all-wheel drive configurations. The cross brace 50 provides a relatively flat, rigid surface for mounting and/or supporting the electric drive components 42 within the electrified vehicle 12, thereby improving noise, vibration, and harshness and increasing durability.

The cross brace 50 may also serve as a master ground for the electric drive components 42 mounted thereto. This ensures that all high voltage modules have a case ground, thereby eliminating the need for external ground cables.

In another embodiment, the integrated mounting system 40 excludes the electric machine 14, such as for rear-wheel drive configurations. Thus, the configuration of the integrated mounting system 40 is not limited to the exact configuration shown in FIG. 3.

The charger stack 56 may be mechanically secured to the platform 66 of the cross brace 50 using a plurality of fasteners 68. The fasteners 68 may be high strength bolts or any other type of fasteners. The exact mounting locations of the fasteners 68 relative to the cross brace 50 and the charger stack 56 are not intended to limit this disclosure.

Figure 4:
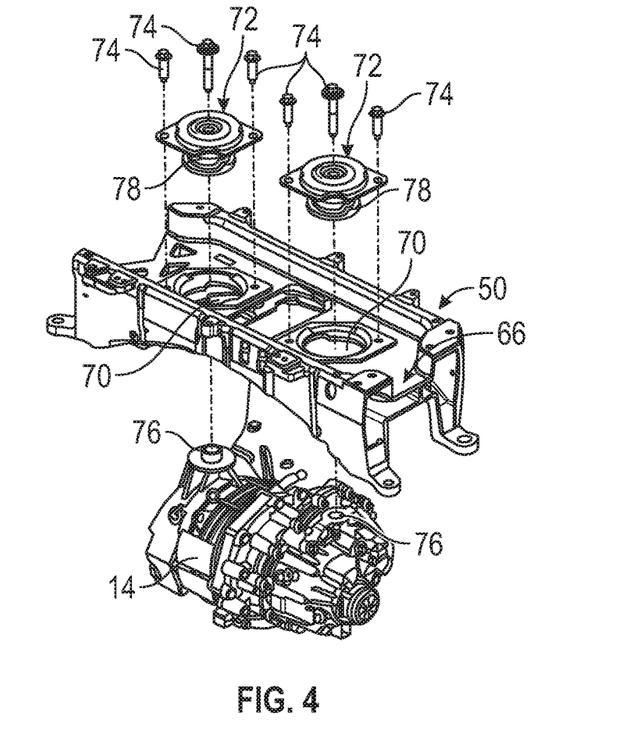
FIG. 4 is an exploded view of portions of the integrated mounting system of FIG. 3.

Referring to FIG. 4, the electric machine 14 may be mechanically secured to an undersurface of the platform 66 of the cross brace 50. The charger stack 56, the first bridging side bracket 52, and the second bridging side bracket 54 of the integrated mounting system 40 are intentionally omitted in the exploded view of FIG. 4 for clarity.

The platform 66 of the cross brace 50 may include openings 70 for receiving isolator mount mounts 72. The electric machine 14 may be suspended from the platform 66 by inserting a plurality of fasteners 74 (e.g., using a top down approach) through either the platform 66 or the isolator mounts 72 and then into mount holes 76 of the electric machine 14. Each isolator mount 72 may include a bushing 78 that is configured to act as a point of isolation for isolating the electric machine 14 from noise, vibration and harshness (NVH) and other high acceleration loads that may act on the vehicle frame 36 and the cross brace assembly 48. The stiffness and other design characteristics of the bushings 78 of each isolator mount 72 may be tuned to address the specific load isolation requirements of the electric machine 14. In addition, the exact manner in which the electric machine 14 is suspended from the platform 66 is not intended to limit this disclosure.

Figure 5:
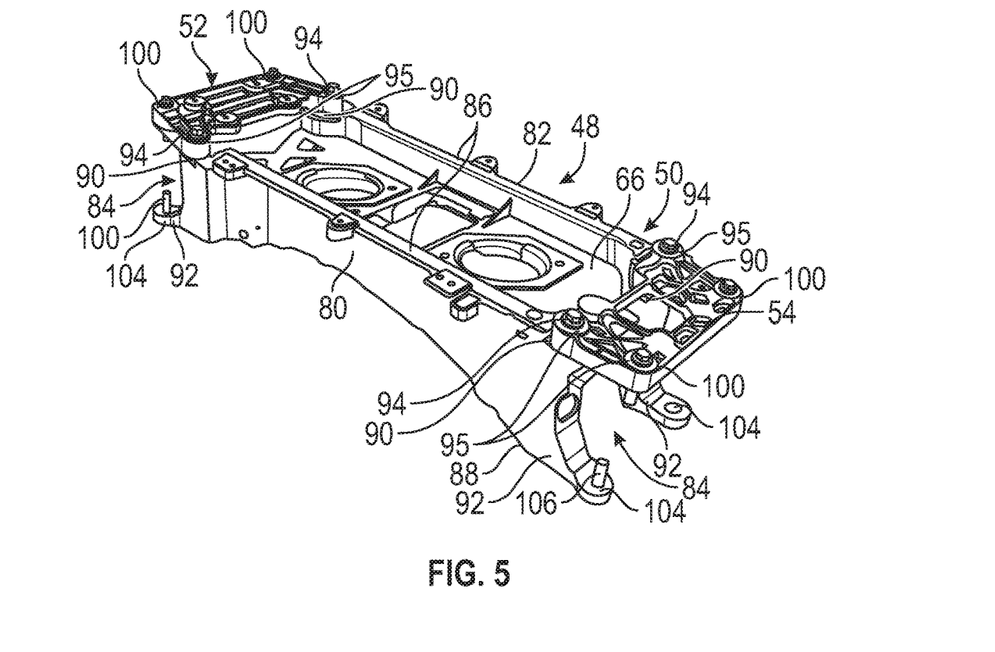
FIG. 5 illustrates a cross brace assembly of the integrated mounting system of FIG. 3.
Figure 6:
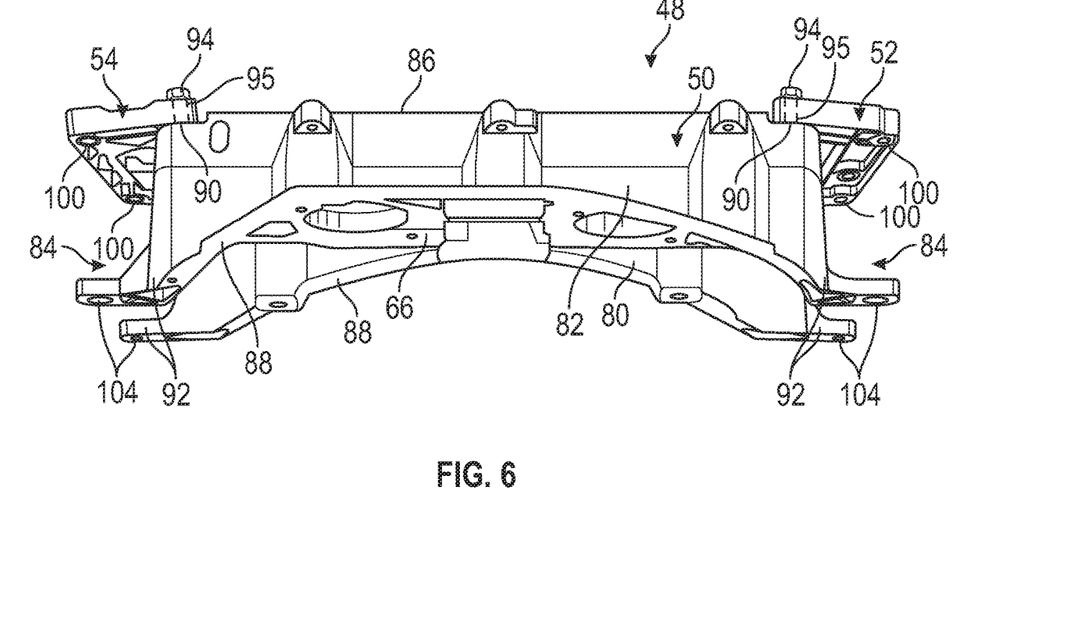
FIG. 6 is a front view of the cross brace assembly of FIG. 5.
Figure 7:
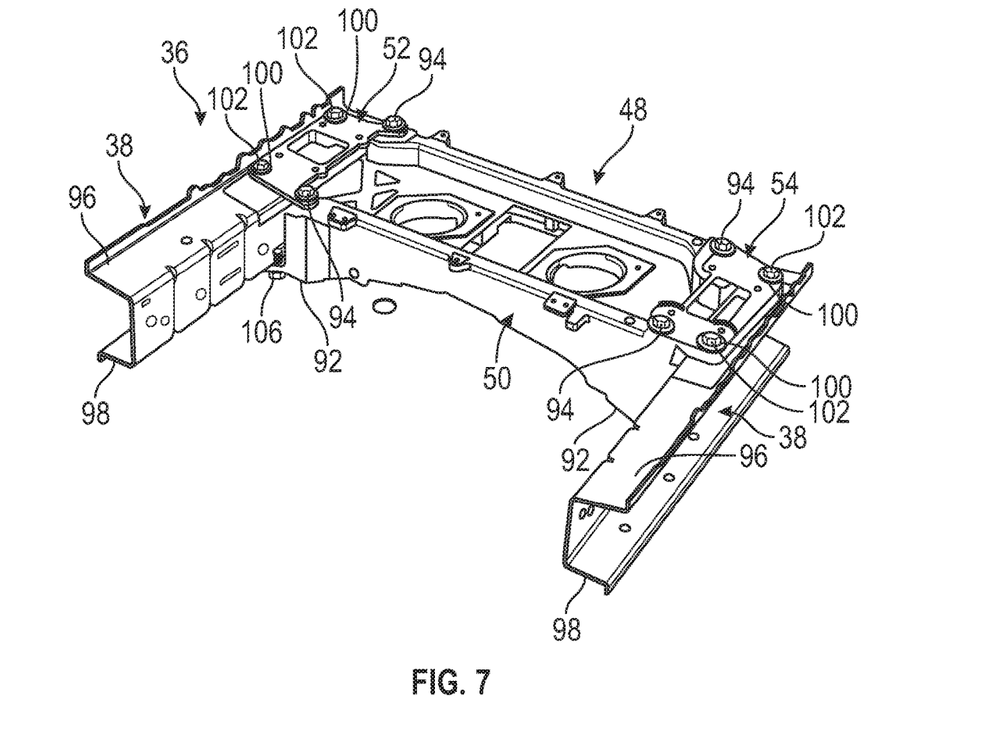
FIG. 7 illustrates a cross brace assembly mounted to a vehicle frame of an electrified vehicle.

FIGS. 5, 6, and 7 illustrate further details of the cross brace assembly 48 of the integrated mounting system 40. The cross brace assembly 48 is illustrated alone in FIGS. 5 and 6 and is shown mounted to the rails 38 of the vehicle frame 36 in FIG. 7.

The cross brace 50 of the cross brace assembly 48 may include a front wall section 80 and a rear wall section 82. The platform 66 may connect to and extend between the front wall section 80 and the rear wall section 82. Each of the front wall section 80 and the rear wall section 82 may extend between opposing end portions 84 and between an upper surface 86 and a lower surface 88. Mount pads 90 may be disposed at an interface between the upper surfaces 86 and the opposing end portions 84, and mount legs 92 may be disposed at an interface between the lower surfaces 88 and the opposing end portions 84. In an embodiment, the upper surfaces 86 of the front wall section 80 and the rear wall section 82 are substantially flat, and portions of the lower surfaces 88 of the front wall section 80 and the rear wall section 82 are arched or curved.

The first bridging side bracket 52 and the second bridging side bracket 54 may be mounted at opposite ends of the cross brace 50. For example, the first and second side bridging brackets 52, 54 may be mechanically secured to the mount pads 90 using any number of fasteners 94 (e.g., bolts). The fasteners 94 may be received through mount holes 95 formed in the first and second bridging side brackets 52, 54.

Referring now primarily to FIG. 7, the cross brace assembly 48 may be mechanically mounted to both an upper surface 96 (i.e., the surface that faces away from a ground surface upon which the electrified vehicle 12 may travel) and a lower surface 98 (i.e., the surface that faces toward the ground surface) of each rail 38 of the vehicle frame 36. For example, each of the first bridging side bracket 52 and the second bridging side bracket 54 may include one or more mount holes 100 for receiving fasteners 102 (e.g., bolts). The fasteners 102 may be inserted (e.g., using a top-down approach) through the mount holes 100 and into the rails 38. In addition, each mount leg 92 of the cross brace 50 may include one more mount holes 104 for receiving fasteners 106 (e.g., bolts). The fasteners 106 may be inserted (e.g., using a bottom-up approach) through the mount holes 104 and then into the rails 38. Together, the fasteners 102 and the fasteners 106 fixedly secure the cross brace assembly 48 to both the upper surface 96 and the lower surface 98 of each rail 38. Of course, an opposite configuration is also contemplated in which the first bridging side bracket 52 and the second bridging side bracket 54 are secured relative to the lower surfaces 98 and the cross brace 50 is secured relative to upper surfaces 96. In addition, although two bridging brackets are depicted, a single bridging bracket could alternatively be employed within the scope of this disclosure. Although not shown, additional components (e.g., compressor, battery, etc.) could be mounted atop the first bridging side bracket 52, the second bridging side bracket 54, or both.

Once secured to the rails 38, the cross brace assembly 48 generally establishes a structural sub-frame of the vehicle frame 36. Mounting the cross brace assembly 48 to both the upper surface 96 and the lower surface 98 of each rail 38 may advantageously increases the stiffness and resistance to bending of the vehicle frame 36, allow the cross brace assembly 48 to evenly distribute vehicle loads between the rails 38, provide improved frontal impact consistency, and provide for improved flexibility during the vehicle assembly process.

Figure 8A:
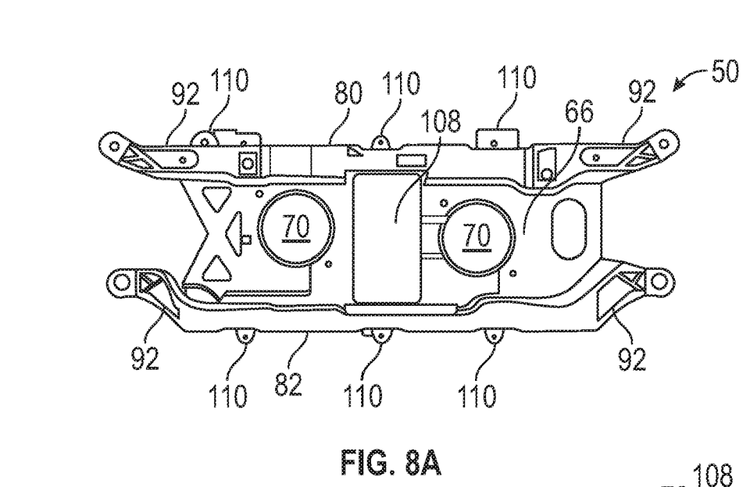
FIGS. 8A, 8B, and 8C illustrate an exemplary cross brace of a cross brace assembly.
Figure 8B:
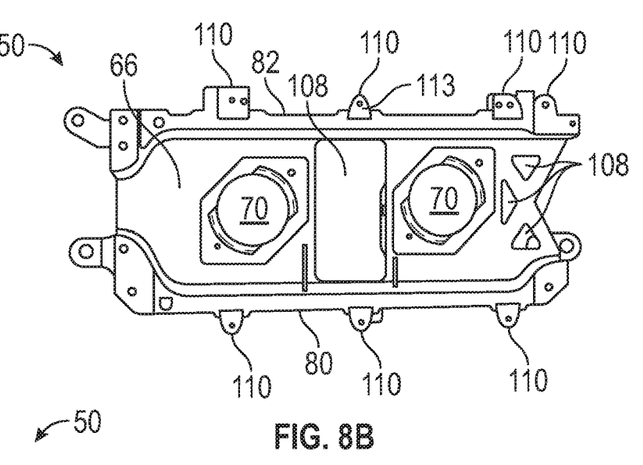
Figure 8C:
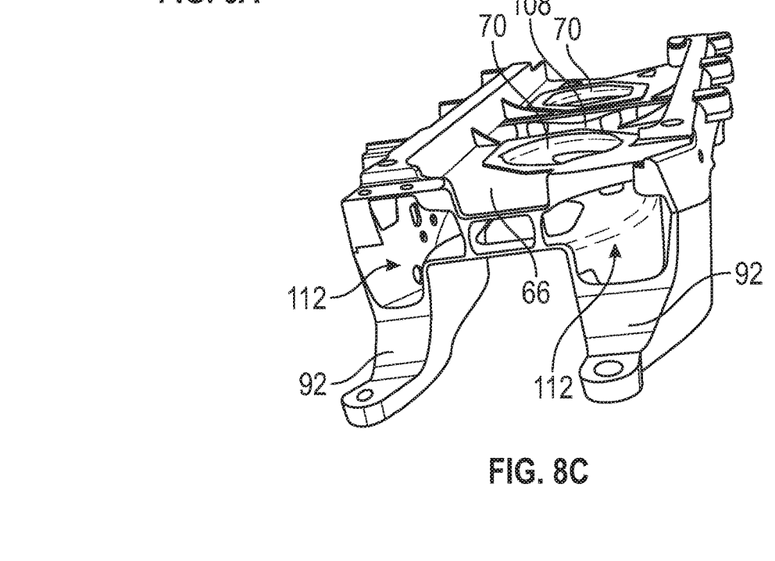

Additional images of the cross brace 50 of the exemplary cross brace assembly 48 described above are depicted in FIGS. 8A-8C. FIG. 8A is a bottom view of the cross brace 50, FIG. 8B is a top view of the cross brace 50, and FIG. 8C is a cross-sectional perspective view of the cross brace 50.

In addition to the openings 70 that are configured to receive the isolator mounts 72, the platform 66 of the cross brace 50 may include multiple additional cut-out openings 108. The cut-out openings 108 may be formed through the platform 66 for routing various wiring, hoses, tubing, etc. within the integrated mounting system 40. In addition to the features described above, the front wall section 80 and the rear wall section 82 of the cross brace 50 may each include a plurality of mount tabs 110 that are configured to receive fasteners for mounting various electric drive components to the cross brace 50.

The cross brace 50 may be made of any high strength and lightweight material or combination of materials. In an embodiment, the cross brace 50 is constructed of an aluminum alloy (e.g., A356). However, other materials, including but not limited to magnesium and steel, could additionally or alternatively be utilized. The specific size, shape, material make-up, and overall configuration of the cross brace 50 are not intended to limit this disclosure.

The cross brace 50 may be manufactured in a casting process, such as a low pressure die casting process. The cross brace 50 may be cast (e.g., by using sand core technology) to include one or more hollow sections 112 (see FIG. 8C). Among other benefits, the hollow sections 112 serve to reduce the weight of the cross brace 50, thereby providing a relatively high strength to weight ratio. The wall thickness of the cross brace 50 may vary across different sections of the component to provide an overall geometry that is optimized for a specific vehicle design.

Figures 9A, 9B, 9C:
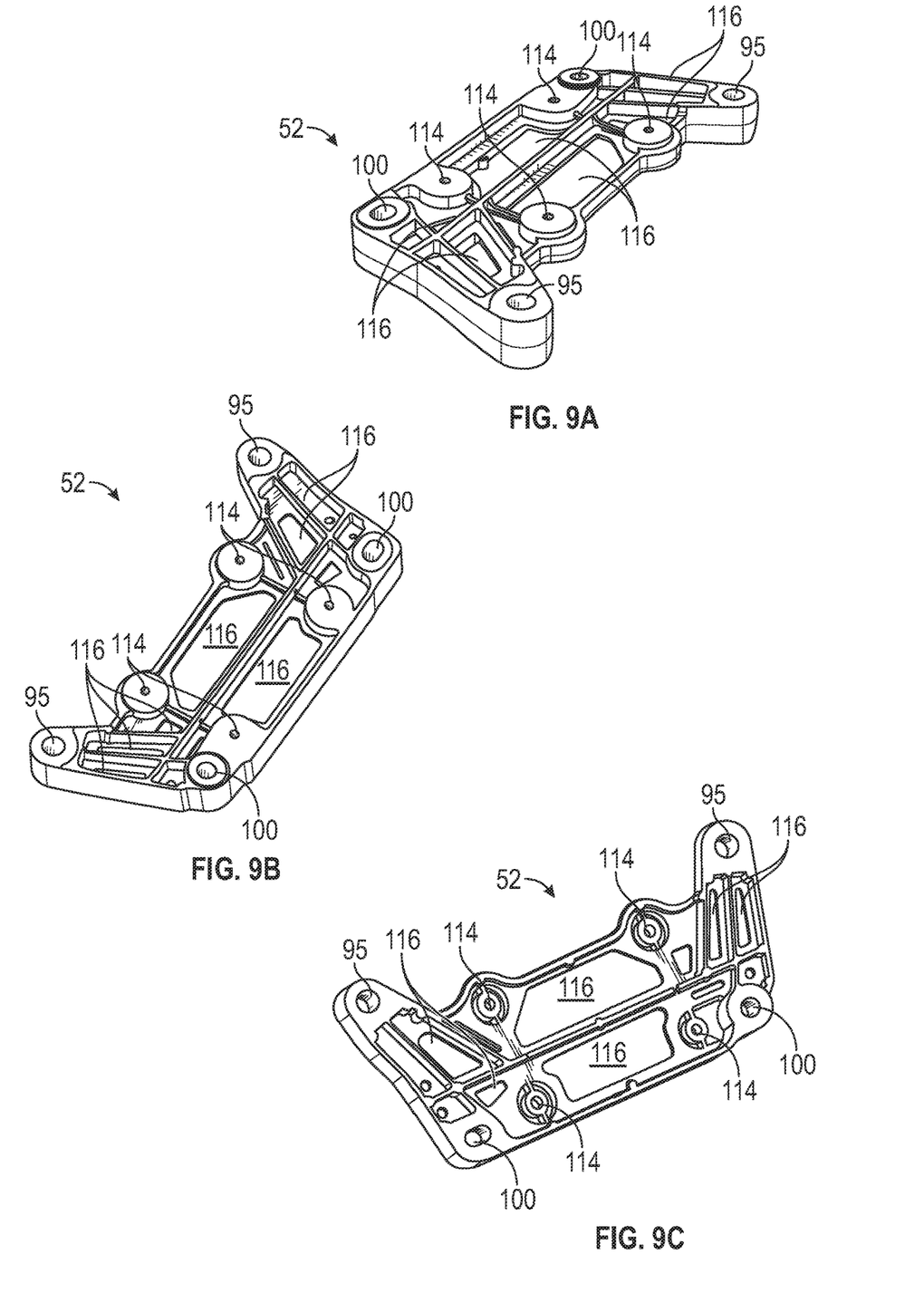
FIGS. 9A, 9B, and 9C illustrate an exemplary first bridging side bracket of a cross brace assembly.

FIGS. 9A-9C illustrate additional details of the first bridging side bracket 52. As detailed above, the first bridging side bracket 52 may include one or more mount holes 95 for attaching the first bridging side bracket 52 to the cross brace 50 and one or more mount holes 100 for attaching the first bridging side bracket 52 one of the rails 38 of the vehicle frame 36. The first bridging side bracket 52 may include additional mount holes 114 for receiving a multitude of additional fasteners.

The first bridging side bracket 52 may further include multiple additional cut-out openings 116. The cut-out openings 116 may be cast into or formed through the first bridging side bracket 52 for routing various wiring, hoses, tubing, etc. within the integrated mounting system 40.

The first bridging side bracket 52 may be made of any high strength and lightweight material or combination of materials. In an embodiment, the first bridging side bracket 52 is constructed of an aluminum alloy (e.g., A380). However, other materials, including but not limited to magnesium and steel, could additionally or alternatively be utilized. The specific size, shape, material make-up, and overall configuration of the first bridging side bracket 52 are not intended to limit this disclosure.

The first bridging side bracket 52 may be manufactured in a casting process, such as a high pressure die casting process. In an embodiment, the casting process used to construct the first bridging side bracket 52 is a different casting process than the one used to construct the cross brace 50 of the cross brace assembly 48.

Figure 10A:
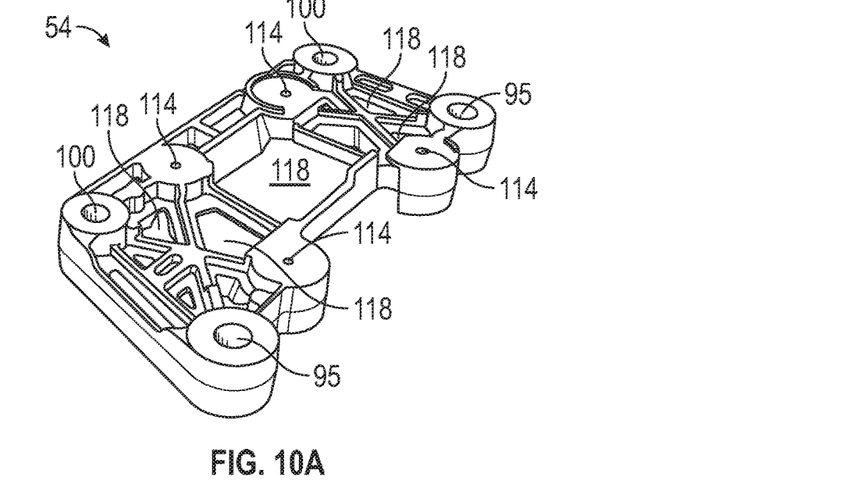
FIGS. 10A, 10B, and 10C illustrate an exemplary second bridging side bracket of a cross brace assembly.
Figure 10B:
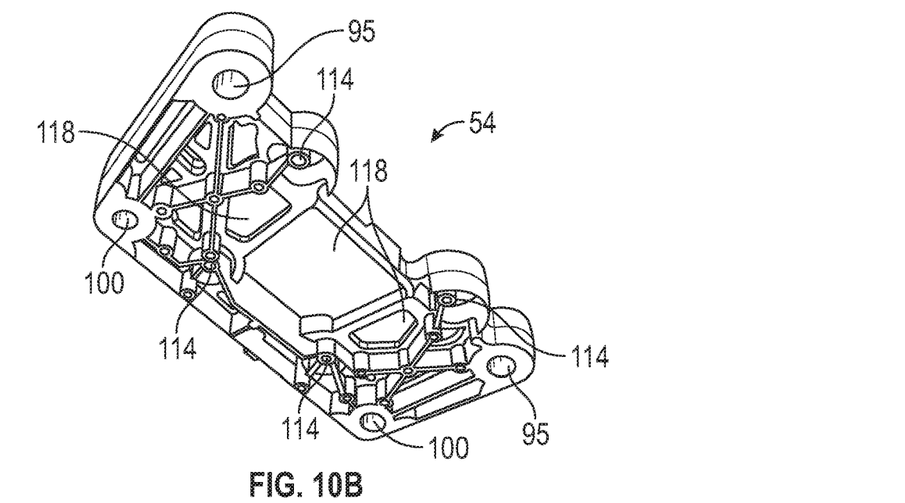
Figure 10C:
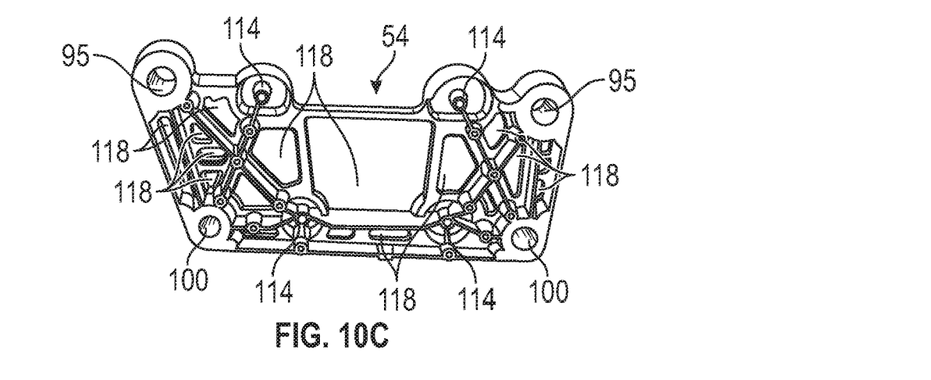

FIGS. 10A-10C illustrate additional details of the second bridging side bracket 54. As detailed above, the second bridging side bracket 54 may include one or more mount holes 95 for attaching the second bridging side bracket 54 to the cross brace 50 and one or more mount holes 100 for attaching the second bridging side bracket 54 to one of the rails 38 of the vehicle frame 36. The second bridging side bracket 54 may include additional mount holes 114 for receiving a multitude of additional fasteners.

The second bridging side bracket 54 may further include multiple cut-out openings 118. The cut-out openings 118 may be cast into or formed through the second bridging side bracket 54 for routing various wiring, hoses, tubing, etc. within the integrated mounting system 40.

The second bridging side bracket 54 may be made of any high strength and lightweight material or combination of materials. In an embodiment, the second bridging side bracket 54 is constructed of an aluminum alloy (e.g., A380). However, other materials, including but not limited to magnesium and steel, could additionally or alternatively be utilized. The specific size, shape, material make-up, and overall configuration of the second bridging side bracket 54 are not intended to limit this disclosure.

The second bridging side bracket 54 may be manufactured in a casting process, such as a high pressure die casting process. In an embodiment, the casting process used to construct the second bridging side bracket 54 is a different casting process than the one used to construct the cross brace 50 of the cross brace assembly 48.

The exemplary integrated mounting systems of this disclosure provide modular solutions for mounting various electric drive components to a vehicle frame using a single, integrated assembly. The integrated mounting systems provide for robust and serviceable mounting solutions that evenly distribute vehicle loads, are suitable for various electrified powertrains, meet NVH and durability requirements, provide a smaller vertical packaging stack-up, and improve stiffness and impact performance.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An integrated mounting system for an electrified vehicle, comprising:
    a cross brace assembly including a cross brace, a first bridging side bracket mounted to the cross brace, and a second bridging side bracket mounted to the cross brace;
    a first electric drive component suspended from the cross brace by at least one isolator mount;
    a second electric drive component mounted at a plurality of mount tabs of the cross brace,
    wherein the first electric drive component is mounted to an undersurface of a platform of the cross brace and the second electric drive component is mounted atop the platform,
    wherein the cross brace includes a front wall section, a rear wall section, and the platform connects between the front wall section and the rear wall section, and each of the front wall section and the rear wall section extends between opposing end portions and between an upper surface and a lower surface; and
    mount pads disposed at an interface between the upper surfaces and the opposing end portions of the front wall section and the rear wall section, and comprising mount legs disposed at an interface between the lower surface and the opposing end portions of the front wall section and the rear wall section.

2. The integrated mounting system as recited in claim 1, wherein the first electric drive component is an electric machine and the second electric drive component is a charger stack, and further wherein the charger stack includes a high voltage charger, a motor controller, a DC/DC converter, and a communications gateway.

3. The integrated mounting system as recited in claim 1, wherein the at least one isolator mount is received within an opening of the platform of the cross brace.

4. The integrated mounting system as recited in claim 1, wherein portions of the front wall section and the rear wall section are arched or curved.

5. The integrated mounting system as recited in claim 1, wherein the second electric drive component is mounted directly over top of the platform of the cross brace.

6. An integrated mounting system for an electrified vehicle, comprising:
    a cross brace assembly including a cross brace, a first bridging side bracket mounted to the cross brace, and a second bridging side bracket mounted to the cross brace;
    a first electric drive component suspended from the cross brace by at least one isolator mount; and
    a second electric drive component mounted at a plurality of mount tabs of the cross brace,
    wherein the first bridging side bracket is mounted to each of the cross brace and an upper surface of a first vehicle frame rail, the second bridging side bracket is mounted to each of the cross brace and an upper surface of a second vehicle frame rail, and the cross brace is mounted to a lower surface of both the first vehicle frame rail and the second vehicle frame rail.

7. The integrated mounting system as recited in claim 6, comprising a first plurality of fasteners for mounting the first bridging side bracket to the upper surface of the first vehicle frame rail, a second plurality of fasteners for mounting the second bridging side bracket to the upper surface of the second vehicle frame rail, a third plurality of fasteners for mounting the cross brace to the lower surface of the first vehicle frame rail, and a fourth plurality of fasteners for mounting the cross brace to the lower surface of the second vehicle frame rail.

8. The integrated mounting system as recited in claim 7, wherein the third plurality of fasteners are received through a first set of mount legs of the cross brace, and the fourth plurality of fasteners are received through a second set of mount legs of the cross brace.

9. An electrified vehicle, comprising:
    a vehicle frame rail;
    a cross brace assembly mounted to the vehicle frame rail; and
    an electric drive component secured relative to the vehicle frame rail by the cross brace assembly,
    wherein a cross brace of the cross brace assembly is mounted to a lower surface of the vehicle frame rail and a bridging side bracket of the cross brace assembly is mounted to an upper surface of the vehicle frame rail,
    wherein the bridging side bracket is mounted directly to an end portion of the cross brace,
    wherein the cross brace extends in a cross-width direction of the electrified vehicle between the vehicle frame rail and a second vehicle frame rail, and further wherein a mount leg of the cross brace is bolted directly to the lower surface of the vehicle frame rail and the bridging side bracket is bolted directly to the upper surface of the vehicle frame rail.

10. The electrified vehicle as recited in claim 9, wherein the electric drive component is an electric machine, a charger stack, or both, and further wherein the wherein the electrified vehicle is a battery electric vehicle (BEV).

11. The electrified vehicle as recited in claim 9, wherein the vehicle frame rail extends within a front compartment of a front end assembly of the electrified vehicle.

12. The electrified vehicle as recited in claim 9, comprising a first plurality of fasteners that secure the bridging side bracket to the cross brace, a second plurality of fasteners that secure the bridging side bracket to the upper surface of the vehicle frame rail, and a third plurality of fasteners that secure the cross brace to the lower surface of the vehicle frame rail.

13. The electrified vehicle as recited in claim 12, wherein the first plurality of fasteners extend through a first set of mount holes of the bridging side bracket, the second plurality of fasteners extend through a second set of mount holes of the bridging side bracket, and the third plurality of fasteners extend through a set of mount legs of the cross brace.

14. The electrified vehicle as recited in claim 9, wherein the cross brace includes a hollow section.

15. The electrified vehicle as recited in claim 9, wherein the bridging side bracket includes at least one cut-out opening.

16. The electrified vehicle as recited in claim 9, comprising a second bridging side bracket mounted to the cross brace and to an upper surface of the second vehicle frame rail, and wherein the cross brace is mounted to a lower surface of the second vehicle frame rail.

17. The electrified vehicle as recited in claim 9, wherein the cross brace is comprised of a first aluminum alloy and the bridging side bracket is comprised of a second, different aluminum alloy.

\* \* \* \* \*